United States Patent [19]

Müller

[11] Patent Number: 5,462,254
[45] Date of Patent: Oct. 31, 1995

[54] BULK MATERIAL CONTAINER HAVING A BOTTOM OUTLET VALVE

[75] Inventor: Josef Müller, Frankfurt am Main, Germany

[73] Assignee: Hoechst Aktiengesellschaft, Frankfurt am Main, Germany

[21] Appl. No.: 237,214

[22] Filed: May 3, 1994

[30] Foreign Application Priority Data

May 5, 1993 [DE] Germany .................... 43 14 794.1

[51] Int. Cl.$^6$ .................................. F16K 31/46
[52] U.S. Cl. .................... 251/144; 251/294; 251/359
[58] Field of Search ...................... 251/144, 294, 251/359

[56] References Cited

U.S. PATENT DOCUMENTS

| | | | |
|---|---|---|---|
| 2,166,484 | 7/1939 | Carlson | 251/144 X |
| 2,241,316 | 5/1941 | Porteous | 251/144 |
| 3,415,486 | 12/1968 | De Frees | 251/144 X |
| 3,498,319 | 3/1970 | Schnabel | 251/294 X |
| 3,537,679 | 11/1970 | McCarthy et al. | 251/144 |
| 3,828,819 | 8/1974 | Brogren | 251/294 X |
| 3,949,963 | 4/1976 | Aoki | 251/144 X |
| 4,203,468 | 5/1980 | Dietz | 251/294 X |
| 4,560,283 | 12/1985 | Eirich et al. | 366/188 |

FOREIGN PATENT DOCUMENTS 999118  1/1952  France.

OTHER PUBLICATIONS

English language abstract of Soviet Union Patent No. 927, 648, Soviet Inventions Illustrated, Section PQ, Week K12, May 4, 1983.
English language abstract of Soviet Union Patent No. 793, 881, Soviet Inventions Illustrated, Section PQ, Week D39, Nov. 4, 1981.
English language abstract of Japanese Patent Publication No. 58-006910, vol. 7, No. 69, Mar. 23, 1983.

*Primary Examiner*—John Rivell
*Attorney, Agent, or Firm*—Finnegan, Henderson, Farabow, Garrett & Dunner

[57] ABSTRACT

In the bulk material container having a bottom outlet valve, a valve seat (2) having a conically shaped feed side (25) is arranged in a conductor tube (1) which is attached at the bottom outlet of the container (24). On the outlet side, on the valve seat is supported a dished valve disk (3), which projects by its dishing into the opening of the valve seat (2) and which has a guide pin (4) on its hollow side. The guide pin is mounted to be able to slide in a guide sleeve (6) arranged in the conductor tube (1) and is connected to an actuating device.

4 Claims, 2 Drawing Sheets

BULK MATERIAL CONTAINER HAVING A BOTTOM OUTLET VALVE

To pack tablets, capsules, coated tablets and the like, termed "bulk material" below, the bulk material is withdrawn from a bulk material container via a bottom outlet valve and fed to an appropriate packaging machine. If the bulk material is a medicament or foodstuff, the bottom outlet valve must comply with a series of requirements:

the bulk material must not be damaged or broken on opening and closing the valve, since fragments lead to problems in the packaging machine, all components of the valve must be easy to demount and easy to clean, the valve must have no areas in which bulk material can remain unnoticed, the bulk material container and the valve must empty completely on their own without assistance of further aids, during throughflow of the bulk material stream, no accumulations of bulk material must occur in the shut-off valve which impede the outflow of bulk material or bring it to a standstill.

The known bulk material containers are furnished with shutting flaps. The solution is not satisfactory, since when the shutting flaps are activated, bulk material is broken and the flaps often cannot be closed.

It is further known to furnish bulk material containers with a soft rubber or plastic tube as a shut-off element, through which the bulk material flows out. To shut off the flow, the free end of the tube is twisted with respect to the fixed end by a mechanism until the tube is closed. The mechanism required for this is complicated. This shut-off apparatus is difficult to dismantle for cleaning and bulk material can remain unnoticed in the folds of the twisted soft tube.

SUMMARY OF THE INVENTION

The invention is intended to create a remedy here. The object is achieved by a bulk material container having a bottom outlet valve in which, in a conductor tube, which is attached at the bottom outlet of the container, is arranged a valve seat having a conically shaped feed side on which is mounted on the outlet side a dished valve disk which projects by its dishing into the opening of the valve seat and has on its hollow side a guide pin which is mounted to be able to slide in a guide sleeve arranged in the conductor tube and which is connected to an actuating device.

The valve seat can be designed to be elastic and have a sealing lip, on which the valve disk is supported on the outlet side. The actuating device can comprise a mechanical (Bowden cable, flex safe bore cable having an actuating lever and the like), a pneumatic, hydraulic or electric drive.

The advantage of the bulk material container according to the invention is essentially that its bottom outlet valve comprises few components, which components are easy to clean and can easily be demounted. It can be used anywhere where the outflow of the sensitive bulk materials from the containers is to be shut off or released. The soft sealing lip of the valve prevents the sensitive bulk materials from being broken if they should become clamped between the valve disk and valve seat when the valve is closed. The bulk material container has no dead areas in which bulk material can remain unnoticed. Dust deposits are also restricted to a very small extent by the simple structure of the valve. The valve can be actuated by a hand-lever mechanism as described below; however, the valve can alternatively be actuated pneumatically, hydraulically, by screw spindles or electrically.

BRIEF DESCRIPTION OF THE DRAWINGS

The invention is described in more detail below on the basis of drawings depicting only one embodiment. In the figures

DESCRIPTION OF THE PREFERRED EMBODIMENTS

Figure 1:
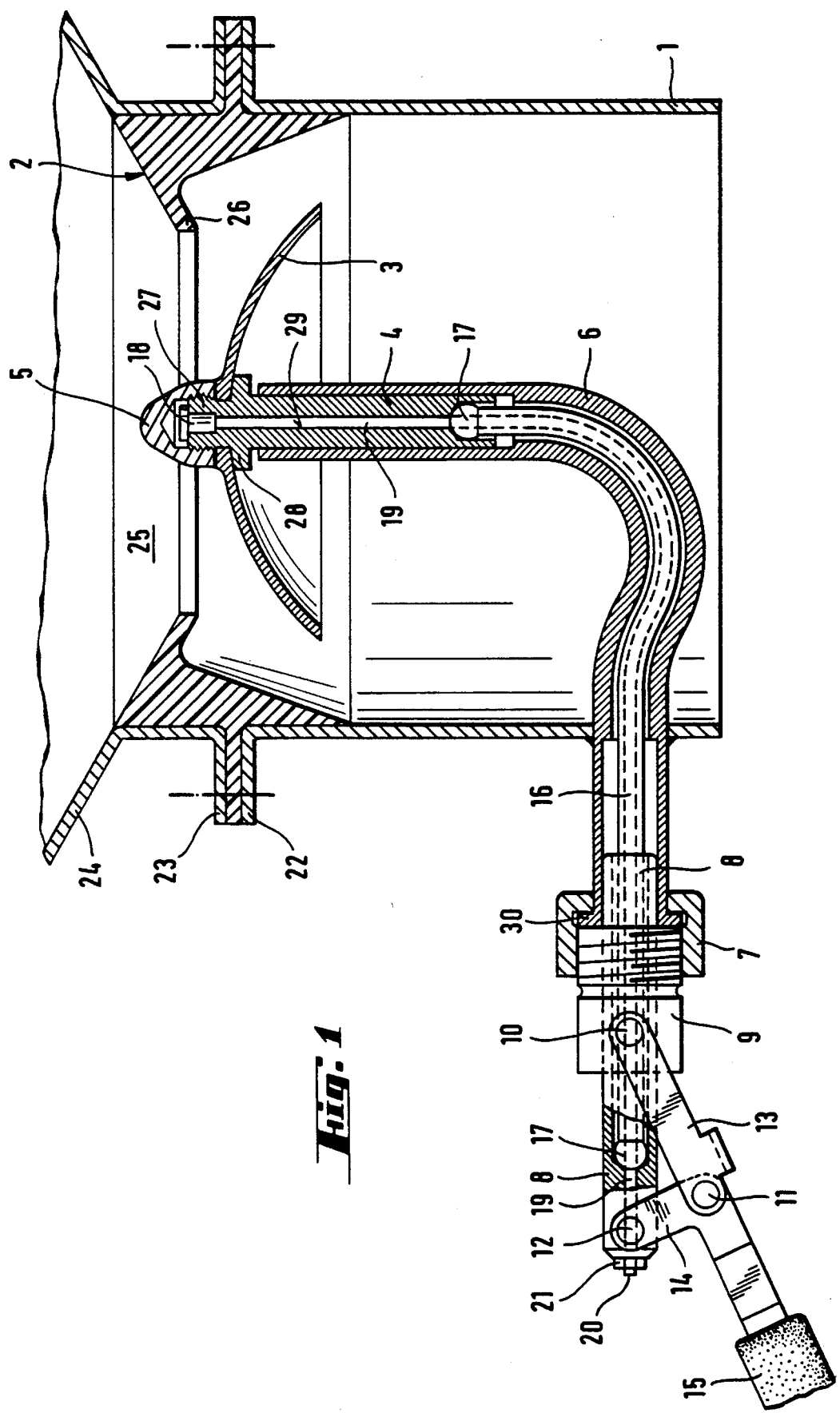
FIG. 1 shows the bottom part of the bulk material container, with the bottom outlet valve open, in section
Figure 2:
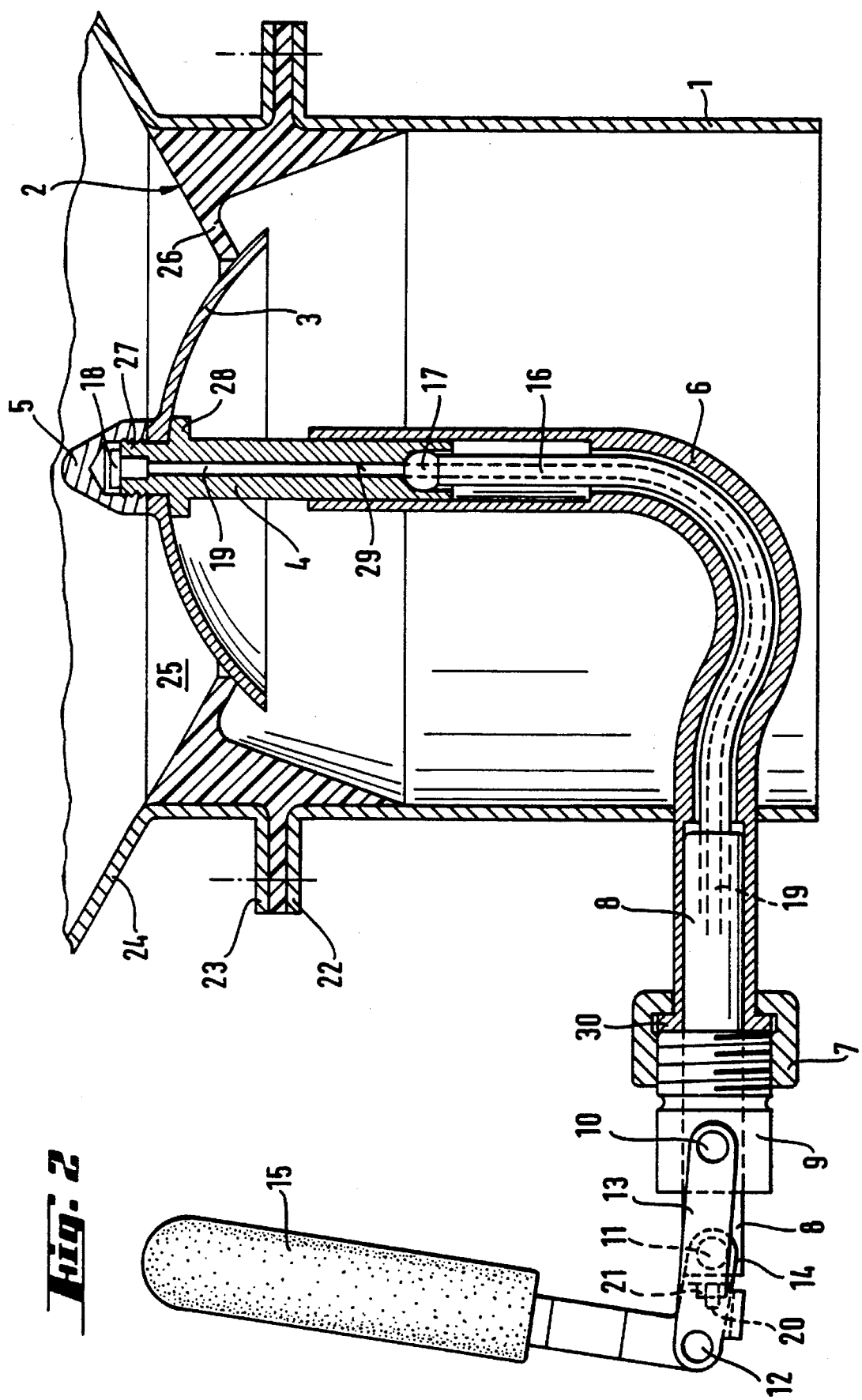
FIG. 2 shows the closed bottom outlet valve, in section.

The bottom outlet valve comprises a conductor tube 1 which is open on both sides and is attached, for example, by flange 22 to flange 23 of the bottom outlet of the bulk material container 24. In the conductor tube 1 is arranged the valve seat 2. It is conically shaped on the feed side 25, as a result of which it adopts a guide function for the bulk material. It can have an elastic sealing lip 26, on which is supported on the outlet side a dished valve disk 3 which, when the valve is closed, projects by its dishing into the opening of the valve seat 2 (FIG. 2). On the hollow side of the valve disk 3 is arranged a guide pin 4 which can pass through the valve disk and which is mounted to be able to slide in a guide sleeve 6 arranged in the center (concentrically) of the conductor tube 1. The guide pin 4 is connected to an actuating device. The actuating device can comprise a pneumatic, hydraulic, electric or mechanical drive. Without restricting the invention hereto, only a mechanical drive is described in more detail below.

The valve disk 3 has a central hole, through which passes a threaded stem 27 of the guide pin 4. Beneath this threaded stem 27, the guide pin 4 possesses an annular shoulder 28, on which rests the valve disk 3. By means of a cap nut 5, the valve disk 3 is clamped against the annular shoulder 28 of the guide pin 4. The cap nut 5 externally has the shape of a cone with a highly rounded point. The guide pin 4, in the axial direction, has a continuous bore hole 29 which, at the ends of the pin, expands stepwise to a larger diameter. In this bore hole is seated at the top end a nipple 18 of an actuating cable 19. Beneath the valve disk 3, likewise centrally to the opening of the valve seat 2, is situated the vertical part of the guide sleeve 6 centrically and coaxially with the axis of the conductor tube 1. The guide pin 4 is inserted from above into this vertical part of the guide sleeve 6. When there is an upwards or downwards movement of the valve disk, the guide pin 4 travels in the guide sleeve 6. The vertical part of the guide sleeve 6, in the lower region of the conductor tube 1, transforms into a 90° bend, so that the further continuation of the guide sleeve proceeds horizontally and passes through the wall of the conductor tube 1 to the outside. Outside the conductor tube 1, it ends with a free end which carries a union nut 7 and a collar 30 surrounding the end in the manner of a ring. A guide piece 9 is pressed against this collar 30 by means of union nut 7, which guide piece guides a slide rod 8 which projects into the guide sleeve 6. The slide rod 8 is connected by a flexible shaft 16 to the guide pin 4 which can be moved to and fro in the guide sleeve 6. At each of the ends of the flexible shaft 16 is mounted and fastened a ball 17. The balls 17, in continuation of the hollow flexible shaft, likewise have bore holes. The flexible shaft 16 is inserted into the guide sleeve 6 and ends in the guide pin 4 on the one side and in the slide rod 8 on the other side. The nipple 18 is inserted into the threaded stem 27 of the guide pin 4. The nipple is firmly attached to the actuating cable 19. The actuating cable 19 is first passed through the bore hole of the one ball 17, run through the hollow flexible shaft 16, in turn passed through the other ball 17 and finally through the slide rod 8. At the end, which projects out of the slide rod 8, the actuating cable 19 is furnished with a threaded pin 20 onto which a nut 21 can be screwed and tightened against the end of the slide rod 8. For the actuation of the slide rod 8, this is connected by an angle lever 14, having hand protection 15 and a rocker 13, to the guide piece 9. 10, 11 and 12 denote the axes of rotation of the lever system. By means of the lever system, the valve disk 3 can be moved both against the valve seat 2 and away from this, in which case it clears the opening of the valve seat 2. In the case of a conical outlet part of the bulk material container 24, it is expedient to choose the same conical angle for the valve seat 2 and to arrange the valve seat 2 in the conductor tube 1 in such a way that the conical outlet part of the bulk material container 20 transforms into the valve seat 2 without a jump and change in gradient.

What is claimed is:

1. A bulk material container having a bottom outlet in communication with a conductor tube, the container comprising:

a housing for containing bulk material, including a conically-shaped bottom outlet;

a valve for controlling the movement of bulk material from the housing into the conductor tube, the valve including a conically-shaped valve seat adjacent the bottom outlet and a valve element, having a substantially convex upper surface, cooperating with the valve seat; and an actuator for selectively engaging the valve element with the valve seat, including a guide sleeve, a guide pin connected to the valve element and having a portion slidably disposed within the guide sleeve, a flexible shaft movable within the guide sleeve and having a proximal end connected to the guide pin and a distal end, a cable disposed within the flexible shaft and connected to the guide pin, and a lever connected to the distal end of the flexible shaft for moving the flexible shaft and cable relative to the guide sleeve, the lever moving the valve element between a seated, closed position and an unseated, open position.

2. The bulk material container of claim 1, wherein the valve seat is elastic and has a sealing lip, on which the valve element is supported.

3. The container of claim 1, further including a slide rod interconnecting the flexible shaft and the lever, the slide rod movable within the guide sleeve.

4. The container of claim 3, wherein the lever is L-shaped and includes one end pivotally attached to the slide rod and a bend connected to the guide sleeve via a linkage and a coupling.

\* \* \* \* \*